June 18, 1940.  W. F. BERCK  2,204,922
PRINTING MECHANISM FOR METER COUNTERS
Filed Sept. 6, 1938  5 Sheets-Sheet 1

INVENTOR.
WILLIAM F. BERCK
BY Oscar A. Mellin
ATTORNEY.

June 18, 1940.  W. F. BERCK  2,204,922
PRINTING MECHANISM FOR METER COUNTERS
Filed Sept. 6, 1938   5 Sheets-Sheet 2

INVENTOR.
WILLIAM F. BERCK
BY
Oscar A. Mellin
ATTORNEY.

June 18, 1940.  W. F. BERCK  2,204,922
PRINTING MECHANISM FOR METER COUNTERS
Filed Sept. 6, 1938  5 Sheets-Sheet 3

INVENTOR.
WILLIAM F. BERCK
BY Oscar A. Mellin
ATTORNEY.

June 18, 1940. W. F. BERCK 2,204,922
PRINTING MECHANISM FOR METER COUNTERS
Filed Sept. 6, 1938 5 Sheets-Sheet 4

INVENTOR.
WILLIAM F. BERCK
BY Oscar A. Mellin
ATTORNEY.

INVENTOR.
WILLIAM F. BERCK
BY
Oscar A. Mellin
ATTORNEY.

Patented June 18, 1940

2,204,922

UNITED STATES PATENT OFFICE 2,204,922

PRINTING MECHANISM FOR METER COUNTERS

William F. Berck, Hayward, Calif., assignor to Ralph N. Brodie Company, Oakland, Calif., a corporation of California Application September 6, 1938, Serial No. 228,563

15 Claims. (Cl. 234—2)

This invention relates to counter mechanisms for fluid meters of the type enabling the reading of the counter to be imprinted on a sales slip or the like.

It is the principal object of the present invention to provide an improved printing mechanism for use with fluid meter counter mechanisms to imprint on a sales slip the reading of the counter, which printing mechanism does not require for operation a direct or indirect connection with the meter, in that after the meter ceases operating, manual operation of the printing mechanism causes the type members thereof to automatically assume a definite printing position with relation to the counter indicating wheels, and thereafter the imprinting is entirely manually effected.

One form which the invention may assume is exemplified in the following description and illustrated by way of example in the accompanying drawings, in which.

Referring more particularly to the accompanying drawings, 10 indicates a part of the frame of a counter for a fluid meter. This frame 10 supports all of the printing mechanism of this counter. The counter is preferably of the type disclosed in my copending application entitled "Counting and indicating device for fluid meters," Serial No. 201,338, filed April 11, 1938, and the present printing mechanism in this instance is designed for use in connection with the counter there illustrated and described. However, the printing mechanism here disclosed is not limited to such use.

Arranged adjacent the frame 10 and suitably supported by other frame mechanism not here illustrated, because it is not important to an understanding of the present invention, are a plurality of dial wheels 11 constituting the tenths, units, tens, hundreds and thousands dial wheels. It is to be understood that these dial wheels are operated by a counter mechanism from the meter and will indicate the quantity of fluid passing through the meter. It is desirous in some instances to imprint on a sales slip the position of these dial wheels at the commencement of an operation and the position of the dial wheels at the end of an operation in order to record gallonage passed through the meter during a particular operation. Preferably, prior to the starting of an operation the dial wheels are reset to a zero position, which position will be imprinted on a sales slip inserted into the present printing mechanism, recording that the counting mechanism was at a zero position prior to the starting of the operation. After the desired amount of gallonage is passed through the meter, a second reading of the dial wheels is imprinted on the sales slip to show accurately the amount thus passed through the meter.

Figure 6:
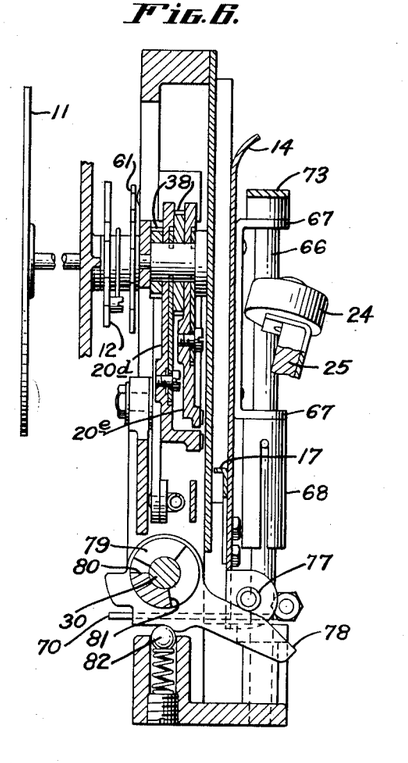
Fig. 6 is a vertical sectional view taken on line VI—VI of Fig. 1.
Figure 11:
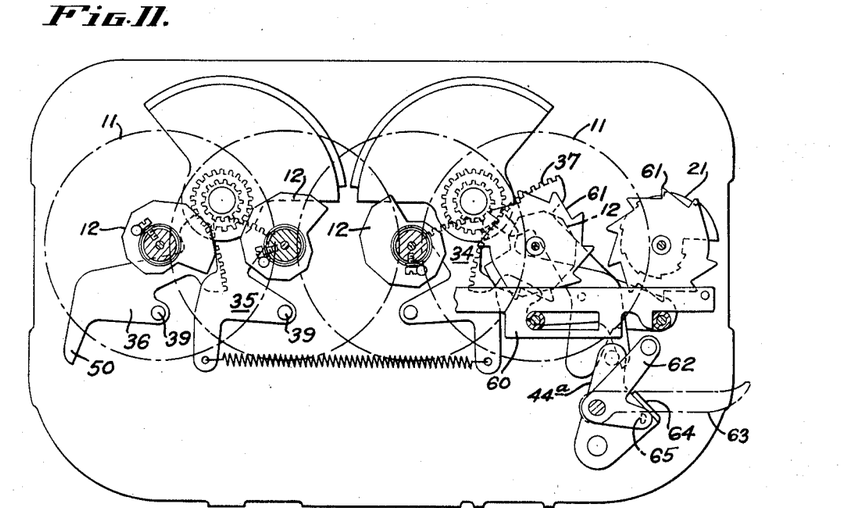
Fig. 11 is a fragmentary view showing the relationship of the cams, the dial wheels, the type segments and the resetting mechanism.

As will be seen from Figs. 6 and 11, the dial wheels 11 are each fitted with a relatively fixed cam 12, the cam of each dial wheel, of course, revolving with the dial wheel and at all times assuming a definite corresponding position relative thereto.

Figure 1:
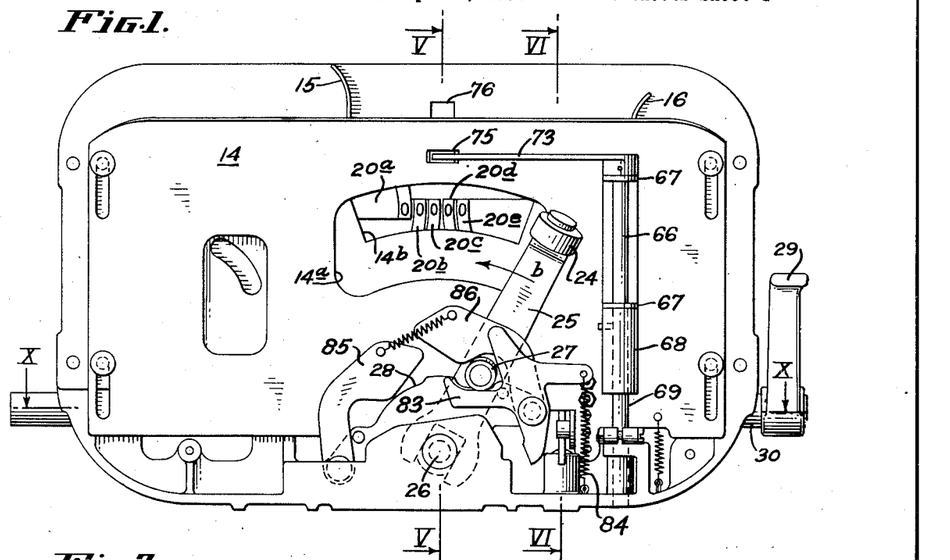
Fig. 1 is a view in elevation of a printing mechanism embodying the preferred form of my invention and with the casing normally enclosing the same removed.
Figure 2:
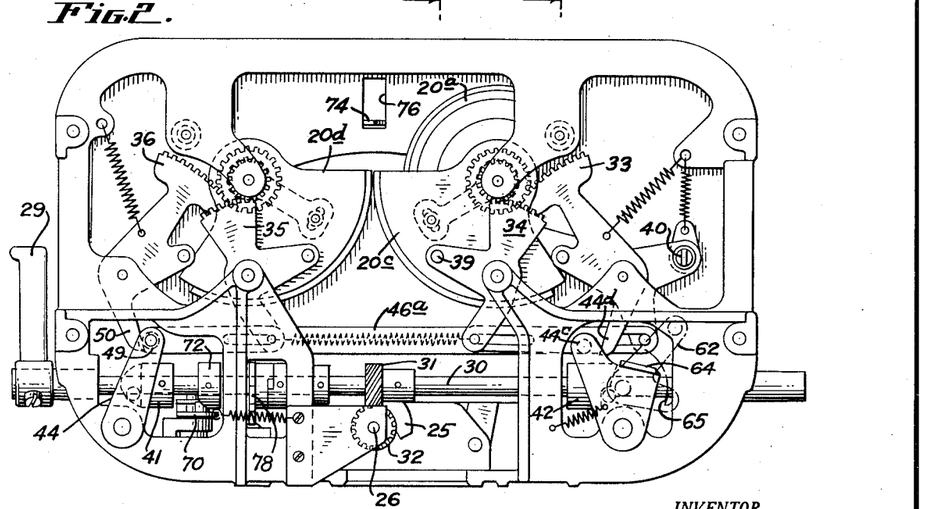
Fig. 2 is a view of the mechanism taken from the side opposite that disclosed in Fig. 1.
Figure 8:
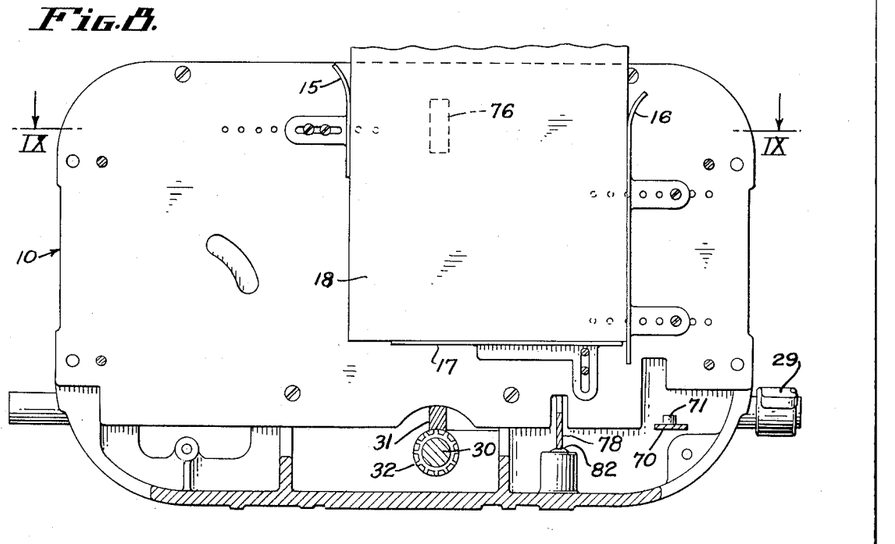
Fig. 8 is a view similar to Fig. 1 with the exception of the removal of the tray and the mechanism at the exterior of the tray.
Figure 9:
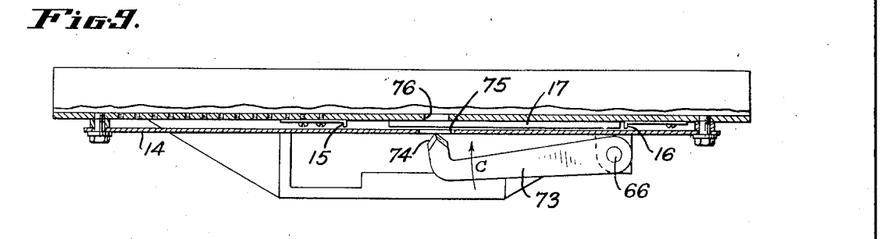
Fig. 9 is a plan sectional view taken on line IX—IX of Fig. 8.
Figure 10:
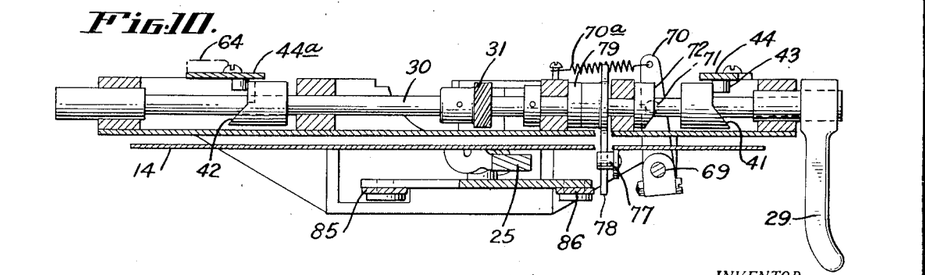
Fig. 10 is a plan sectional view taken on line X—X of Fig. 1.

The frame 10 supports a sales slip supporting tray 14 which, as illustrated in Figs. 1, 8 and 9, lies flatwise at one side of the frame at a spaced distance therefrom, and is so connected with the frame that it may reciprocate vertically a limited amount for the purposes of shifting the sales slip to different printing positions, as will be hereinafter described.

It will be noticed from Fig. 8 that mounted on the frame 10 proper between it and the tray 14 are two adjustable guides 15 and 16 which may be adjusted laterally of the frame to accommodate sales slips of different widths. Intermediate these two guides and adjustably mounted on the side of the tray adjacent the frame is a vertically adjustable foot member 17 against which the lower end of the sales slip 18 abuts when it is inserted downwardly between the tray and the frame, and between the guides 15 and 16. In the neutral position of the printing mechanism, the tray 14 is in its lowermost position as illustrated in Fig. 1, which in this instance will be called the first printing position. As will be described, the reading of the dials is imprinted on the sales slip 18 in this position, and thereafter, just prior to a meter operation, the tray 14 is elevated vertically to move the sales slip to a second printing position so that after a meter operation, the gallonage dispensed by the meter and indicated by the dials 11 may be imprinted on the sales slip so as to record the amount of fluid passed through the meter and delivered during such operation.

Figure 13:
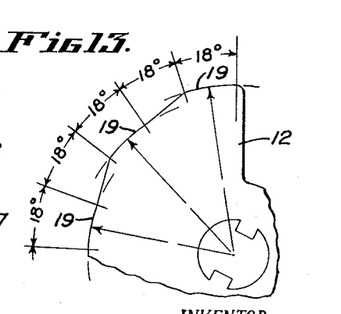
Fig. 13 is an enlarged fragmentary view showing the development of the type positioning determining cams.

It will be noticed from Figs. 11 and 13 that each cam 12 has a series of arcuate faces 19, one being provided for each digit on the indicating dial 11 and which faces increase in radial distance from the center of the cam in geometrical progression. The arcuate faces are each approximately eighteen degrees on the periphery of the cam, there being approximately an eighteen degree spacing between the faces joined by a chord-like face. The position which these cams 12 assume when the dials 11 are positioned by the operation of the meter automatically enables type segments 20 to be positioned so as to place that type numeral in a printing position corresponding to the same numeral on the dial 11 with which it corresponds.

It is desired to point out, however, that during the operation of the meter there is no contact beween the cams 12 and the type segments 20 so that no load is placed on the meter operation by the printing mechanism here disclosed, and that the printing mechanism is in no sense directly or indirectly operated by the meter proper. The meter merely determines the positions which the dial wheels 11 assume to indicate the amount dispensed by the meter, and these dials 11 through their cams 12 determine the setting of the type upon the operation of the printing mechanism subsequent to the meter operation.

In the present instance I have shown, as previously stated, five dial wheels and the cams on all of the dial wheels, except the tenths dial wheel, are of the same design and construction and similarly relatively positioned with respect to their dial wheels. The tenths wheel cam 21, however, is slightly different in formation in that the arcuate surfaces are connected together by radial lines. The arcuate surfaces on the tenths cam are thirty-six degrees long as will be comprehended from Fig. 11. One of the purposes of making this cam purely a step cam, as illustrated, is that the type segment of the tenths wheel is formed with type in tenths of a gallon and it must be necessary for each type to be in full printing position, and if the tenths wheel should stop intermediate its tenths position, this could not be accomplished except by compensation through the medium of a cam of this character.

As will be described further on, the formation of the cam 21 is such that when over one-half of one-tenth of a gallon has been delivered, the position of the cam will enable the next succeeding tenth to be shown in full type position, and if less than one-half of one-tenth of a gallon has been delivered, the tenths wheel will enable positioning of its type to the last tenth position.

Figure 3:
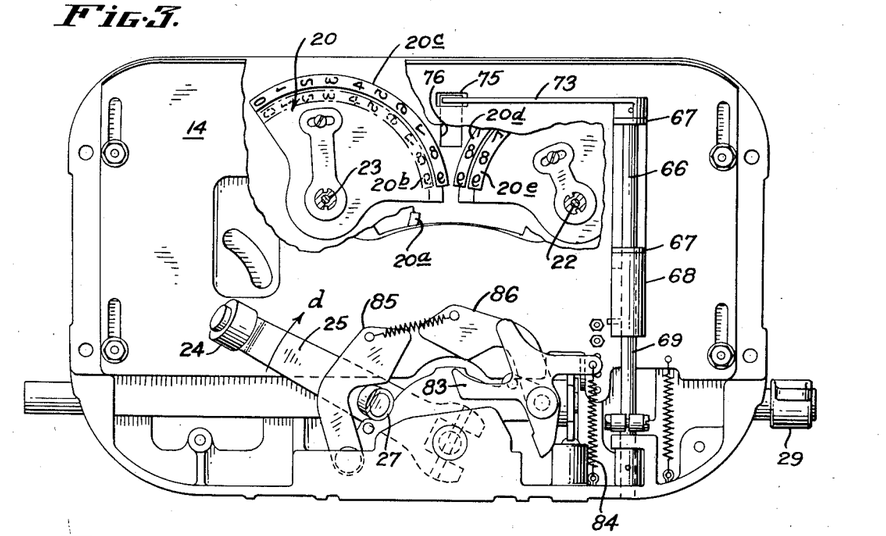
Fig. 3 is a view taken in the same direction as Fig. 1, disclosing the mechanism in the position which it assumes upon the completion of the first cycle of operation of the printing mechanism and with a portion of the frame broken away to more clearly show certain features of construction.
Figure 4:
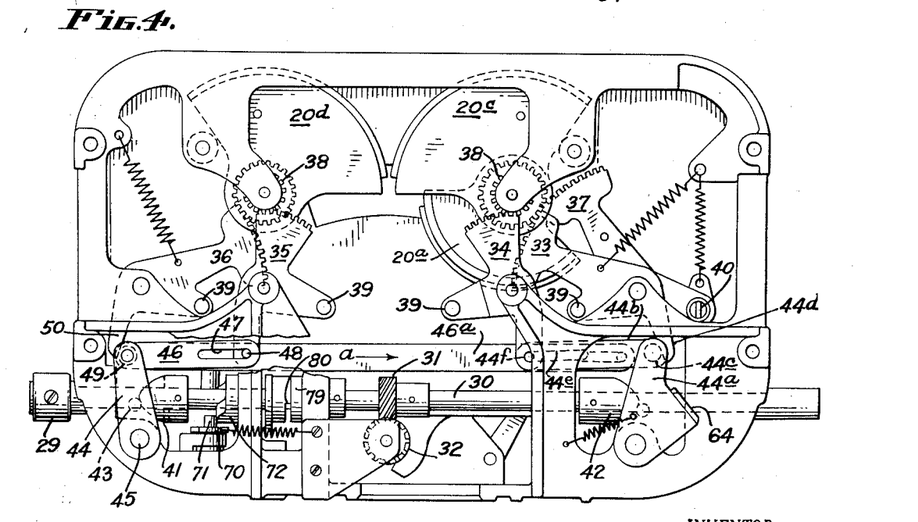
Fig. 4 is a view similar to Fig. 2 except that it discloses the mechanism in the position it assumes upon the completion of the first cycle of the operation of the mechanism.
Figure 5:
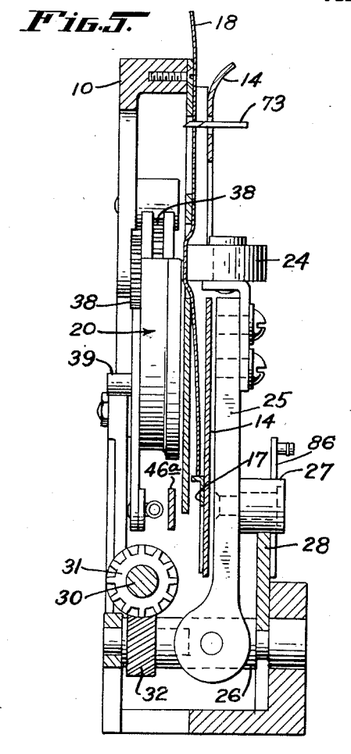
Fig. 5 is a vertical section through the mechanism taken on line V—V of Fig. 1.

The type segments 20 are most clearly illustrated in Figs. 3, 4 and 6. There are five of these type segments 20, four being for the units, tens, hundreds and thousands, and one which is indicated by the numeral 20a is for the tenths dial wheel. It will be noticed from Fig. 3 that I provide two shafts properly supported in the frame 10, which shafts are indicated by the numerals 22 and 23. Two of the segments 20 are mounted on the shaft 22 and two of the segments and in addition the segment 20a are mounted on the shaft 23, and they are independently turnable about said shafts. The segments 20 and 20a are formed with segmental type surfaces on the sides thereof contiguous to their periphery. The radial distance which these type surfaces are arranged on the segments is different in order that they may assume side by side positions with their faces lying in the same plane so that the type thereon may be all engaged by a moving platen 24 passing thereover as indicated in Figs. 1 and 6.

The type face of each segment is formed with type numerals, zero to 9, corresponding to the numerals on the dial wheels. Each type segment 20 and 20a is fitted with a pinion 38 relatively fixed thereto in an adjustable manner, in order that the type figures on the segments may be adjusted relative to the type figures on the dials 11 so that they will assume an accurate corresponding position with relation to the dials.

It will be noticed that the tray 14 has an opening 14a formed therein and that the frame on the inner side of the tray 14 has an opening 14b formed therein. It is in these openings that the printing type of the segments 20 and 20a align horizontally in printing position, as illustrated in Fig. 1, so that they may be engaged by the roller platen 24 when the latter is operated to effect imprinting.

It should be stated that the roller platen 24 is revolubly mounted on the outer end of a platen lever 25. The other end of the lever 25 is in the form of a clevice and is pivoted to a shaft 26 for pivotal movement in a plane disposed longitudinally of said shaft. The turning movement of the shaft 26, of course, swings the lever 25 in a direction so that the roller platen 24 will roll over the faces of the type of the segments 20 and 20a disposed in printing position. However, to insure printing contact between the roller platen 24 and the type in printing position, the platen lever 25 is formed with a projecting cam roller 27 which projects with its axis substantially parallel with the axis of the shaft 26. This roller is adapted to engage the surface of a fixed cam 28 so positioned as to engage said roller substantially at its outer end, which causes the lever 25 to move in the plane of the axis of the shaft 26 as the roller traverses the cam 28. The formation of the cam 28 is such that when the platen 24 approaches the type in printing position from either direction, the lever 25 is swung to cause the platen 24 to move toward the type in printing position with sufficient pressure to effect imprinting on a sales slip interposed therebetween.

It should be pointed out at this time that the sales tag is manifold with interposed carbon transferring surfaces so that when the platen 24 moves over the type in printing position and in register therewith, suitable imprinting is accomplished on the manifold sales tag.

To operate the type segments and the platen, I provide an operating lever 29 fixed on one end of a shaft 30 which extends longitudinally of the frame 10 and journalled therein as illustrated. On this shaft 30 is a helical gear 31 in mesh with a helical gear 32 on the shaft 26, so that when the lever 29 is operated, it will rotate the shaft 30 and through the helical gears 31 and 32 impart rotation to the shaft 26, which in turn will swing the lever 25 and effect imprinting as previously described.

To operate the segments, each one thereof is equipped with a segment lever. For clearness I will indicate the units type segment as 20b, the tens type segment as 20c, the hundreds type segment as 20d, and the thousands type segment as 20e. The units type segment is provided with a segment lever 33. The tens type segment is provided with a segment lever 34. The hundreds type segment is provided with a segment lever 35. The thousands type segment is provided with a segment lever 36 and the tenths type segment is provided with a segment lever 37. These segment levers are all provided with toothed segmental portions engaging the pinions 38 of their respective type segments.

The segment levers 33 to 36, inclusive, are also each provided with a cam roller 39 properly positioned with respect to their segmental toothed portions. These cam rollers 39 are for cooperation with the cams 12 so that when these cam rollers 39 are in engagement with the cams 12, the type segments will be positioned, due to the toothed connection between the segment levers 33 to 36, inclusive, so that the proper type numeral thereon will correspond properly with the indicated digit on the dials 11.

The segmental lever 37 for the tenths type segment is not provided with a roller 39, but is provided with a blade 40 which cooperates with the step cam 21 on the tenths dial wheel for a reason similar to that just described.

It is obvious, however, that by shifting the levers 33 to 37, inclusive, by means other than the cams 12 and 21, the cam rollers 39 and the blade 40 may be shifted to a position entirely out of engagement with the cams 12 and 21 so that the latter may freely rotate, and this is done prior to the commencement of the operation of the meter in order that there will be no load imposed on the meter by the printing mechanism during the meter operation.

To accomplish such shifting, the shaft 30 is provided with two similar end cams 41 and 42, each having a rest period for approximately one-half of their diameter. The cam 41 is adapted to engage a cam roller 43 on a lever 44 pivoted at one end to the frame as at 45. The other end of the cam lever 44 is pivotally connected to a link 46, the cam roller 43 being positioned intermediate the ends of the lever 44, as most clearly illustrated in Fig. 4. The link 46 is provided with a slot 47 engaged with which is a pin 48 secured to the segment lever 35. At the pivotal connection between the lever 44 and the link 46 is a cam roller 49 engaging a finger 50 integrally formed with the segment lever 36. The outer end of the lever 44 is also pivotally connected to a second link 46a which extends laterally across the frame, and at its other end is provided with an elongated slot 51, best illustrated in Fig. 12. Engaged with this slot is a pin 52 secured on the segment lever 37 for the tenths wheel.

Figure 12:
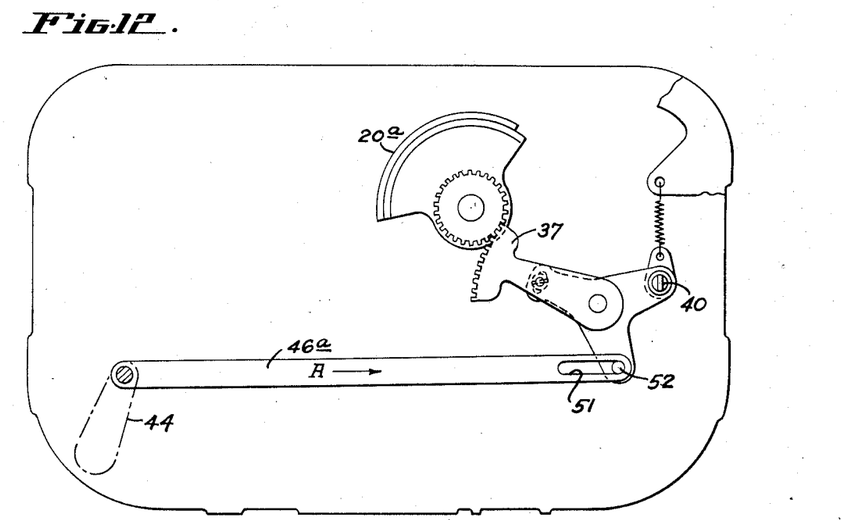
Fig. 12 is a fragmentary view illustrating the tenths type segments and its associated linkage.

It is seen that when the links 46 and 46a are moved in the direction of the arrow a in Figs. 4 and 12, that the slots 47 and 51 permit a lost motion so as to undisturb the position of the segment levers 35 and 37, and likewise the cam roller 49 moves away from the finger 50 so as to undisturb the position of the segment lever 36. However, when the links 46 and 46a are moved in a direction opposite that of arrow a in Figs. 4 and 12, should the levers 35 to 37, inclusive, be positioned where the ends of the slots 47 and 51 and the roller 49 will engage the fixed pins 48 and 52 and the roller 49 engage the finger 50, or either of them, the segment levers 35 to 37, inclusive, or the ones so engaged will be swung about their pivotal points and return the type segments to their inoperative or neutral position and simultaneously move the cam rollers 39 and the blade 40 to a position entirely out of engagement with the cams 12 and 21, which position is such in relationship to these cams that the latter may revolve completely without engaging the cam rollers 39 or the blade 40.

A similar connection is made between the cam 42 and the segment levers 33 and 34 through the medium of a cam lever 44a and a link 44b. The cam lever 44a has a cam roller 44c to engage a finger 44d on the segment lever 33. The link 44b has a slot 44e engaging a pin 44f on the segment lever 34. Inasmuch as the cams 41 and 42 are opposed, the same turning movement of the shaft 30 will operate the segment levers 33 and 34 in the same manner that the levers 35 and 36 are operated by the cam 41, the only difference being that the segments are turned in the opposite direction, but the same result is effected.

It should be pointed out that the levers 33 to 37, inclusive, are all provided with spring means such as illustrated which constantly tend to move the cam rollers 39 and the blade 40 into engagement with the peripheries of the cams 12 and 21.

Referring to Fig. 11, it will be seen that I have provided a reciprocable reset bar 60 adapted to engage ratchet wheels 61 on the shafts of the dial wheels 11. This in my copending application previously referred to causes resetting of the dials to zero when the bar 60 is reciprocated longitudinally by means of a pivotal lever 62 shown in Fig. 11. On the pivotal point of this lever 62 is an operating handle 63 by oscillation of which the bar 60 is reciprocated. To prevent resetting of the dials 11 during the operation of the meter, I provide an abutment 64 on the lever 44a. This lever assumes the position shown in Fig. 11 during the operation of the meter, at which point a pin 65 projecting from the bell crank lever 62 will engage the abutment 64 and will be held thereby from oscillating to an extent sufficient to reciprocate the reset bar 60 and thereby reset the dials 11.

In operation of the device, it is constructed and assembled as illustrated and maintained in a definite position with respect to the dial wheels 11 of the counter device and their cams 12 and 21. Assuming that the meter with which the present mechanism and counter is associated is not in operation, and that the dial wheels are at zero position and it is desired to deliver some desired quantity of fluid through the meter, the mechanism will be in the position shown in Fig. 1, at which time a sales slip may be inserted between the tray 14 and the frame 10 as illustrated in Fig. 8. Also in this position the dial segments will have the zero type numerals disposed in printing position corresponding with the zero position of the dial wheels 11. This will be so because the cam rollers 39 and the blade 40 will at this time be in engagement with the cams 12 and 21, which, due to the position of the dial wheels 11, will have the surfaces corresponding to the zero position of the dials in register with the cam rollers 39 and the blade 40. It should be pointed out that if the dial wheels 11 are not in zero position, the position of the cams 12 and 21 thereof will determine the position of the segments through the medium of the levers 33 to 37, inclusive, by the engagement of the rollers 39 and the blade 40 with the proper surfaces of the cams 12 and 21 so that it is not essential to the operation of this device that the dials 11 be reset to zero, or to any other position, for proper operation of this printing mechanism.

Before the meter commences operating, it is necessary to turn the crank handle 29 to revolve the shaft 30 to perform the first printing operation. Turning of the shaft 30 will, as previously described, through the gears 31 and 32, turn the shaft 26 and swing the lever 25 in the direction of the arrow b in Fig. 1. As the lever 25 swings in that direction, the cam 28 will act on the cam roller 27 so as to press the roller platen 24 toward the type numbers of the type segments in printing position and thus effect an imprint of those numbers on the sales tag.

Simultaneously with this movement, however, I provide a means for locking the sales tag into position with respect to the tray and therefore with respect to the displayed printing type. This means comprises a vertical shaft 66 carried by the tray in bearing 67. This shaft 66 is connected through a telescopic joint 68 to a short shaft 69 carried by the frame. The lower end of this shaft carries a lever 70 having a cam pin 71 engaging an end cam 72 on the shaft 30. The initial turning movement of the shaft 30 causes the cam pin 71 to ride up on the high point of the cam 72, thereby partly revolving the shaft 66 through the shaft 69. The upper end of the shaft 66 carries a punch lever 73 with a sharp inturned end 74 adapted to project through an opening 75 in the tray 14. This opening 75 overlies the sales tag 18 when it is positioned in the device and is in register with a long slot 76 in the frame 10, so that when the punch lever 73 is swung in the direction of the arrow c in Fig. 9, it will penetrate through the sales tag and maintain it in a locked position with relation to the tray.

When the lever 25 has swung to a position where the platen 24 has completely traversed over the printing type, the tray 14 is elevated to place the sales tag in a second printing position so that a succeeding imprint will be disposed directly below the first. The elevation of the tray is accomplished by means of a roller (see Fig. 6) 77 carried by the tray 14 adapted to engage a lever 78 revolubly mounted on the shaft 30. A cam 79 secured on the shaft 30 is so formed and so cooperates with fixed shoulders 80 and 81 on the lever 78 that when the shaft 30 is turned in one direction, the free end of the lever 78 will be elevated and this is during the movement of the platen lever 25 just described to elevate the tray to the second printing position. Upon the reverse movement of the shaft 30 the cam engages the shoulder 81 and turns the lever in the opposite direction, lowering the tray. This takes place just subsequent to the second printing operation to be described, there being sufficient lost motion in the operation of the cam 79 with relation to the shoulders 80 and 81 that during the interim between the elevation of the tray just subsequent to the first printing operation and to a point just subsequent to the second printing operation, the tray remains idle.

A spring-pressed ball 82 is provided to engage notches in the lever 78, as illustrated in Fig. 6, to maintain the tray either in its elevated or in its lowered position, when set in these positions by the means just described.

Figure 7:
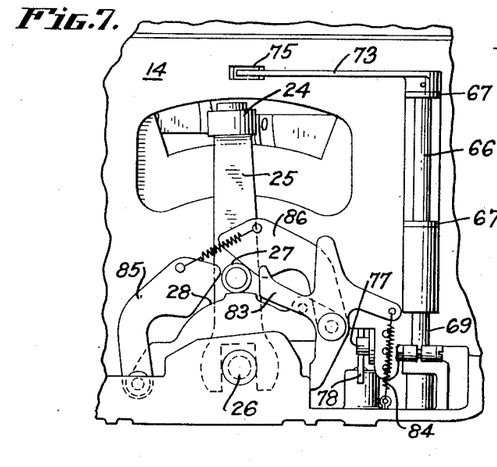
Fig. 7 is a fragmentary view in elevation showing the intermediate position of the platen lever and the manner in which the detent is positioned to prevent its reverse movement.

Just as the platen lever passes over the printing type a detent 83 is caused by a spring 84 to assume a position blocking reverse travel of the cam roller 27, as shown in Fig. 7. Consequently, after inserting a sales slip and commencing to perform the first printing operation the operator cannot return the platen lever to its starting position, thus releasing the tag and enabling fraud to be perpetrated.

It will also be noticed from Figs. 1 and 3 that two latch levers 85 and 86 are provided which are pivotally connected with the frame and which serve to latch the lever 25, through the medium of the cam roller 27, in the two extreme positions which it assumes. Likewise, these levers act on the cam roller 27, after the printing operation, to move the platen 24 positively in a direction away from the type to prevent it from contacting with and rolling over the tray 14.

Immediately that the shaft 30 is turned sufficiently that the platen 24 passes over the type in printing position, the cams 41 and 42 come into operation to swing the levers 44 and 44a outwardly, operating the links 46, 46a and 44b. This operation of the links, as previously described, and the operation of the fingers 50 and 44d through the medium of the levers 44 and 44a, causes the segment levers 33 to 37, inclusive, to be swung from the positions they are in in engagement with the cams 12 and 21 to a position where the cam rollers 39 and the blade 40 are entirely free from engagement with the cams 12 and 21 so that the later can freely rotate. Incidentally, the type segments are likewise swung to an inoperative position. This movement will be completed upon sufficient turning movement of the shaft 30 to place the platen lever 25 in its extreme left position as viewed from Figs. 1 and 3.

The meter is then placed in operation and as the fluid flows therethrough, it will, through the counter mechanism (not described), operate the dials 11 to indicate the amount of fluid passing through the meter. As these dials revolve to display the amount of fluid passed through the meter, the cams 12 and 21 are revolved simultaneously therewith inasmuch as they are relatively fixed together. Thus, the cams 12 and 21 are positioned so as to constitute the means for determining the setting of the printing segments for the subsequent printing operation. That is to say, that upon the subsequent printing operation, the position of the cams 12 and 21 will determine the positions of the type segments so that the type numerals displayed thereby in printing position will correspond exactly with the numerals displayed by the dials 11. This is accomplished after the meter operation by turning the crank handle of shaft 30 in a direction reverse to that which it was previously turned.

This turning movement of the shaft 30 through the gears 31 and 32 turns the shaft 26 to swing the platen lever 25 in the direction of the arrow $d$ in Fig. 3. Immediately that the shaft 30 commences to operate in this direction, the levers 44 and 44a will be caused to swing about their pivot points and will be so permitted to do by the cams 41 and 42 operating the links 46, 46a and 44b, and releasing the fingers 44d and 50 and thus allowing the spring means to move the cam rollers 39 and the blade 40 into engagement with the periphery of the cams 12 and 21. As previously described, these cams have surfaces corresponding with the digits on the dials 11 so that the positioning of the various type segments will be determined by the position of these cams, and the type numerals on the type segments which are thereby aligned in printing position will correspond with the numerals on the dials 11.

Immediately that this operation of the type segments is completed and the proper type numerals are aligned in printing position, the platen lever 25 is moved to cause the platen 24 to roll over the type surface, and being urged toward the same by the fixed cam 28.

I should point out at this time that just at the completion of the first printing operation, the movement of the tray 14 and the sales slip 18 to the second printing position is accompanied by movement of the detent 83 to the position shown in Fig. 3 due to the upward movement of the lever 78 which engages a fixed portion of the detent and swings it to an unobstructing position.

During this latter portion of the printing operation, the cam 72 permits turning of the lever 70 by means of the spring 70a, which turning movement will be accompanied by turning movement of the shaft 69 in a direction retracting the inturned end of the punch ever 73, releasing the sales slip so that it may be withdrawn from the mechanism.

The turning movement of the shaft 30 in this direction just described will be complete upon the cam roller 27 reaching its furthest position to the right as shown in Fig. 1, where it is latched by the latch member 86. At this time resetting of the dial wheels 11 by means of the reset bar 60 through the medium of the reset lever 63 and the bell crank 62 may be accomplished, which resetting will be accompanied by resetting of the type segments due to the fact that the cam rollers 39 and the blade 40 will be free to follow the contours of the cams 12 and 21, but at all times during this resetting operation the printing type of the segments in printing position will correspond with the displayed digits of the dial wheels so that if the resetting is stopped at any point, the subsequent printing operation will imprint on the sales slip inserted into the mechanism that reading of the dials at which resetting is discontinued.

I wish to point out, however, that the latter resetting operation can only be accomplished after the complete second operation of the shaft 30 through the crank lever 29, due to the engagement of the abutment 64 with the protruding pin 65 of the bell crank lever 62, the abutment 64 being moved to a position at the end of the operation just described, allowing free movement of the lever 62.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an apparatus of the character described, a dial wheel adapted to be positioned in a plurality of different stations, a cam relatively fixed to the dial wheel and to be positioned thereby, a movable member carrying printing type for each dial wheel station, said member being cooperatively associated with said cam whereby the position of the latter will predetermine the printing type on said member which will be disposed in printing position upon movement of said member and a roller platen movable across and back over said printing type at the printing position to effect successive printing operations before and after a setting of the type member.

2. In an apparatus of the character described, a dial wheel adapted to be positioned in a plurality of different stations, a cam operatively associated with the dial wheel to be operated thereby and positioned in a definite position relative to the dial wheel, said cam having a face to correspond with each station of the dial wheel, a movable type member carrying printing type for each dial wheel station, said type member being cooperatively associated with said cam whereby the position of the latter will predetermine the printing type on said type member which will be disposed in printing position upon movement of said type member, and a roller platen movable across and back over the printing type at the printing position to effect successive printing operations before and after a setting of the type member.

3. In an apparatus of the character described, a dial wheel adapted to be positioned in a plurality of different stations, a cam operatively connected to the dial wheel to be positioned thereby in a definite relation to the dial wheel, said cam having a cam surface to correspond with each station of the dial wheel, a movable type member, means associated with said type member and adapted to engage said cam but normally positioned out of engagement with said cam with the type member in an inoperative position, said type member having printing type for each dial wheel station, the engagement of the means on said type member with the cam predetermining the printing type on said type member which will be disposed in printing position upon movement of said type member and a roller platen movable across and back over the printing type at the printing position to effect successive printing operations before and after a setting of the type member.

4. In an apparatus of the character described, a plurality of operatively associated dial wheels all adapted to be positioned in a plurality of different stations, a cam relatively fixed to each dial wheel and to be positioned thereby, each cam having a face to correspond with each station of its associated dial wheel, a movable type member for each dial wheel and associated with the cam of said dial wheel, each type member having printing type for each station of the dial wheel with which it is associated, said type members being cooperatively associated with their respective cams whereby the positions of the latter will predetermine the printing type on said members which will be disposed in printing position upon movement of said members, and a roller platen movable across and back over said printing type at the printing position to effect successive printing operations before and after a setting of the type members.

5. In an apparatus of the character described, a plurality of operatively associated dial wheels all adapted to be positioned in a plurality of different stations, a cam relatively fixed to each dial wheel and to be positioned thereby, each cam having a face to correspond with each station of its associated dial wheel, a movable segmental type member for each dial wheel and associated with the cam of said dial wheel, each type member having printing type disposed on its flat face corresponding to each station of the dial wheel with which it is associated, said type members being cooperatively associated with their respective cams whereby the positions of the latter will predetermine the printing type on said members which will be disposed in printing position upon movement of said members, means for simultaneously moving all of said type members, and a roller platen movable across and back over the printing type disposed in printing position at the printing position to effect successive printing operations before and after a setting of the type members.

6. In an apparatus of the character described, a dial wheel adapted to be positioned in a plurality of different stations, a cam relatively fixed to the dial wheel and to be positioned thereby, said cam having a cam face to correspond with each station of the dial wheel, a movable type member carrying printing type for each dial wheel station, means operatively associated with said type member and normally out of engagement with said cam but adapted for engagement with said cam, which engagement predetermines the printing type on said type member which will be disposed in printing position upon engagement of said means with said cam, a roller platen movable across and back over the printing type at the printing position to effect successive printing operations before and after a setting of the type member, and means for operating said type member and said platen in successive sequence.

7. In an apparatus of the character described, a plurality of relatively associated dial wheels all adapted to assume one of a plurality of different stations, a cam for each dial wheel and operatively connected thereto to assume a definitely relative position with respect thereto upon operation thereof, each cam having a cam face to correspond with each station of its associated dial wheel, a movable segmental type member for each dial wheel having on its flat face printing type corresponding to each station of said dial type and being operatively associated with the cam of said dial wheel whereby the position of the cams will predetermine the type of the type members to be dispposed in printing position upon movement of said members, a roller platen movable across and back over the type disposed in printing position and means for operating said type members and said platen in successive sequence.

8. In an apparatus of the character described, a plurality of operatively associated dial wheels each adapted to be positioned in any one of a plurality of different stations, a cam for each dial wheel operatively connected thereto and to be positioned thereby in a definite relative position with respect thereto, each of said cams having a face to correspond with each station of its associated dial wheel, a movable segmental type member for each dial wheel carrying printing type on its flat face for each dial wheel station, means operatively associated with each of said type members and normally out of engagement with the cam of its respective dial wheel but adapted for engagement with said cam, which engagement determines the printing type on said type member which will be disposed in printing position when said means is engaged with said cam, manually operative means for simultaneously operating said type members to bring the associated means thereof into engagement with their respective cams, and a roller platen movable across and back over the printing type disposed in printing position at the printing position to effect successive printing operations before and after a setting of the type members.

9. In an apparatus of the character described, a plurality of operatively associated dial wheels each adapted to be positioned in any one of a plurality of different stations, a cam for each dial wheel operatively connected thereto and to be positioned thereby in a definite relative position with respect thereto, each of said cams having a face to correspond with each station of its associated dial wheel, a movable segmental type member for each dial wheel carrying printing type on its flat face for each dial wheel station, means operatively associated with each of said type members and normally out of engagement with the cam of its respective dial wheel but adapted for engagement with said cam, which engagement determines the printing type on said type member which will be disposed in printing position when said associated means is engaged with said cam, a roller platen movable across and back over the printing type disposed in printing position, an operating shaft, and means operatively connecting said shaft to said type members and to said platen whereby to move the type members to dispose the predetermined printing type in printing position and to operate the platen to effect successive printing operations before and after a setting of the type members.

10. In an apparatus of the character described, a plurality of operatively associated dial wheels each adapted to be positioned in any one of a plurality of different stations, a cam for each dial wheel operatively connected thereto and to be positioned thereby in a definite relative position with respect thereto, each of said cams having a face to correspond with each station of its associated dial wheel, a movable type member for each dial wheel carrying printing type for each dial wheel station, means operatively associated with each of said type members and normally out of engagement with the cam of its respective dial wheel but adapted for engagement with said cam, which engagement determines the printing type on said type member which will be disposed in printing position when said associated means is engaged with said cam, a roller platen movable across and back over the printing type disposed in printing position, a holder for supporting a sales slip intermediate the type and the platen, an operating shaft, means operatively connecting said shaft to said type members and to said platen whereby to move said type members to dispose the predetermined printing type in printing position and to operate the platen to effect successive printing operations before and after a setting of the type members.

11. In an apparatus of the character described, a plurality of operatively associated dial wheels each adapted to be positioned in any one of a plurality of different stations, a cam for each dial wheel operatively connected thereto and to be positioned thereby in a definite relative position with respect thereto, each of said cams having a face to correspond with each station of its associated dial wheel, a movable type member for each dial wheel carrying printing type for each dial wheel station, means operatively associated with each of said type members and normally out of engagement with the cam of its respective dial wheel but adapted for engagement with said cam, which engagement determines the printing type on said type member which will be disposed in printing position when said means is engaged with said cam, a roller platen movable across and back over the printing type disposed in printing position to effect successive printing operations before and after a setting of the type members, a holder for supporting a sales slip in two different positions intermediate the type disposed in printing position and the platen, an operating shaft, means operatively connecting said shaft to said type carrying members and to said platen and to said holder whereby operation of the shaft will operate said type carrying members and said platen in successive sequence and move the holder to a different position subsequent to each operation of the platen.

12. In an apparatus of the character described, a dial wheel adapted to be positioned in a plurality of different stations, a cam relatively fixed to the dial wheel and to be positioned thereby, said cam having a face to correspond with each station of the dial wheel, a movable type member carrying printing type for each dial wheel station, means operatively associated with said member and normally held out of engagement therewith by yielding means but adapted upon engagement with said cam to predetermine the printing type on said type member which will be disposed in printing position upon operation of the type member, a roller platen movable across and back over the printing type disposed in printing position, a holder for supporting a sales slip in position intermediate said type member and the platen, an operating member, and means operatively connecting said member to said type member and to said platen whereby to move the type member to dispose the predetermined printing type in printing position and to operate the platen to effect successive printing operations before and after a setting of the type member, and means for securing said sales slip in position in the holder during a complete cycle of operation of the platen.

13. In an apparatus of the character described, a dial wheel adapted to be positioned in a plurality of different stations, a cam relatively fixed to the dial wheel and to be positioned thereby, said cam having a face to correspond with each station of the dial wheel, a movable type member carrying printing type for each dial wheel station, means operatively associated with said member and normally held out of engagement therewith by yielding means but adapted upon engagement with said cam to predetermine the printing type on said type member which will be disposed in printing position upon operation of the type member, a roller platen movable across and back over the printing type disposed in printing position, a holder for supporting a sales slip in two different positions intermediate the type member and the platen, an operating member, means operatively connecting said operating member to said type member and to said platen and to said holder whereby operation of said member will cause the type member to move to dispose the predetermined printing type in printing position and operate the platen to effective successive printing operations before and after a setting of the type member and cause the holder to assume a different position subsequent to each operation of the platen.

14. In an apparatus of the character described, a dial wheel adapted to be positioned in a plurality of different stations, a cam relatively fixed to the dial wheel and to be positioned thereby, said cam having a face to correspond with each station of the dial wheel, a movable type member carrying printing type for each dial wheel station, means operatively associated with said member and normally held out of engagement therewith by yielding means but adapted upon engagement with said cam to predetermine the printing type on said type member which will be disposed in printing position upon operation of the type member, a roller platen movable across and back over the printing type disposed in printing position, a holder for supporting a sales slip in two different positions intermediate the type member and the platen, an operating member, means operatively connecting said operating member to said type member and to said platen and to said holder whereby operation of said member will cause the type member to move to dispose the predetermined printing type in printing position and operate the platen to effect successive printing operations before and after a setting of the type member and cause the holder to assume a different position subsequent to each operation of the platen, and means for securing the sales slip in position in the holder during each cycle of operation of the platen.

15. In an apparatus of the character described, a dial wheel adapted to be positioned in a plurality of different stations, a cam relatively fixed to the dial wheel to be positioned thereby, said cam having a face to correspond with each station of the dial wheel, a segmental type member for said dial wheel, said segmental type member having printing type disposed on its flat face corresponding to each station of the dial wheel, means operatively associated with said segmental type member and adapted to engage the cam faces of said cam, which engagement determines which printing type on said member will be disposed in printing position, said segmental type member being normally maintained in a position with said means out of engagement with said cam, means for supporting a sales slip in printing relation to the segmental type member, an operative platen for cooperation with the printing type disposed in printing position, and means for moving said segmental type member into operative position and operating said platen.

WILLIAM F. BERCK.